L. F. PIERCE.
Improvement in Speed-Indicator for Vessels.
No. 128,324.    Patented June 25, 1872.
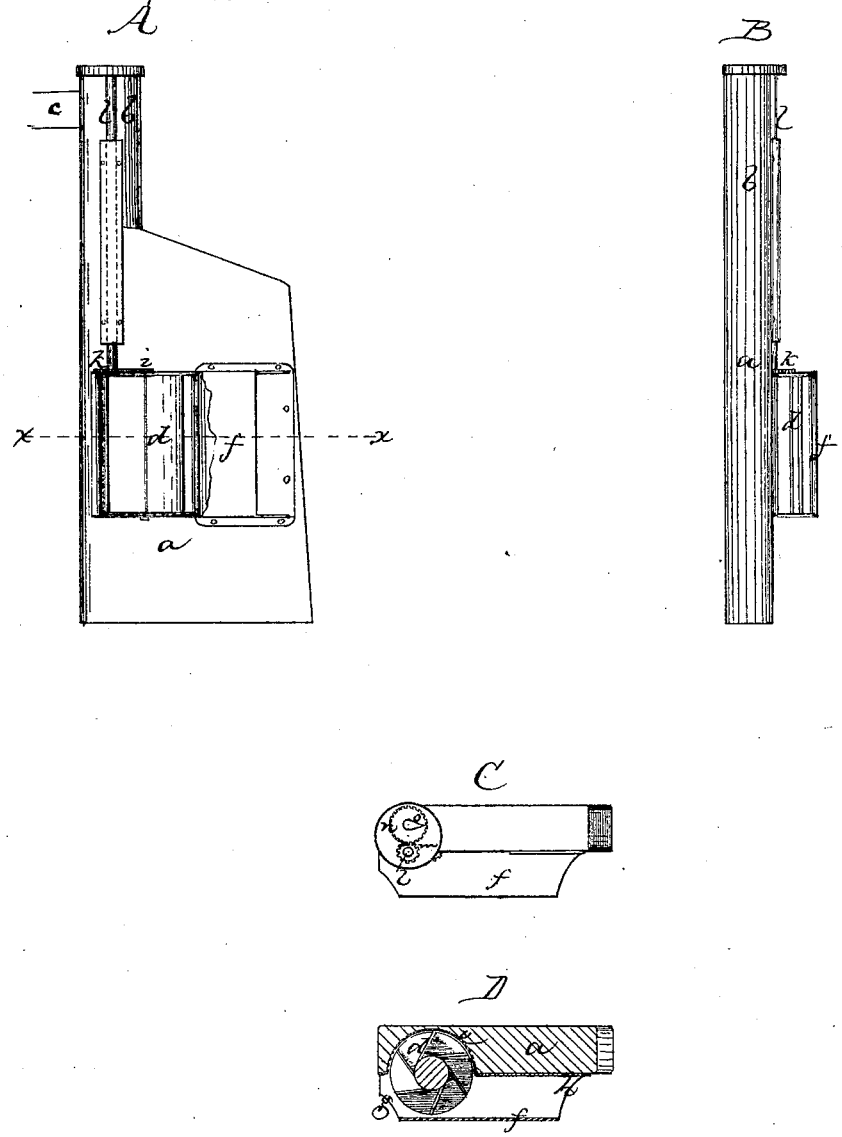
Witnesses.
Mo. W. Frothingham.
S. B. Kidder.
Lewis F. Pierce,
By his Attys.
Crosby & Gould.

UNITED STATES PATENT OFFICE.

LEWIS F. PIERCE, OF BOSTON, MASSACHUSETTS.

IMPROVEMENT IN SPEED-INDICATORS FOR VESSELS.

Specification forming part of Letters Patent No. 128,324, dated June 25, 1872.

*To all whom it may concern:*

Be it known that I, LEWIS F. PIERCE, of Boston, in the county of Suffolk and State of Massachusetts, have invented an Improved Log Mechanism for Vessels; and I do hereby declare that the following, taken in connection with the drawing which accompanies and forms part of this specification, is a description of my invention sufficient to enable those skilled in the art to practice it.

My invention relates to the construction of a ship's log or mechanism for indicating the speed of a vessel.

In my invention I place at the side of the rudder a case open at both ends, and containing a wheel, the blades of which stand vertically, this wheel being so arranged within the case or water-passage, that the flow of water through the case will rotate the wheel. Upon the upper end of the shaft or gudgeon of the wheel is placed a gear-pinion, meshing into another pinion on the foot of a vertical shaft, which extends down from the top of the rudder-post, said shaft having at its top a pinion meshing into and driving an index-wheel, the rotation of the wheel by means of the gearing imparting rotary movement to the index-wheel. As the speed of the index-wheel is dependent upon the speed of the submerged water-wheel, and as the speed of said latter wheel is in accordance with the speed of movement of the vessel, it follows that by suitable calculations, and by observation of the number of points the index-wheel moves in a minute, or any other given time, the speed of the vessel may be read at any time.

My invention consists in combining with a rudder a wheel placed at its side and properly incased, said wheel being submerged and its shaft being connected by suitable gearing with an index-wheel at the top of the rudder-post, or at some other convenient spot upon the vessel, the wheel being so arranged that the motion of the vessel through the water shall cause the wheel to be rotated by the current.

The drawing represents a rudder embodying my invention.

A shows a side elevation of the rudder; B, a front view of it; C, a plan of it; D, a section on the line $x\,x$.

$a$ denotes the rudder; $b$, the post thereof; $c$, the tiller. $d$ denotes the water-wheel. One side of said wheel sits into a recess, $e$, made in the side of the rudder, and the other side is inclosed within a casing, $f$, which casing is open at its front end, as seen at $g$, and at its rear end, as seen at $h$, the casing constituting a water-passage through which the water freely flows. The wheel $d$ is pivoted near the plane of the inner side of the casing, so that the current of water acts upon the blades on one side only of the wheel, thereby effecting its rotation. On the upper end of the wheel-shaft is shown a pinion, $i$, meshing into and driving a pinion, $k$, on the foot of a shaft, $l$, which extends up at the side of the rudder-post $b$, said shaft having at its upper end a pinion, $m$, meshing into and rotating a pinion, $n$, which may be provided with suitable index-marks, the rotation of the gear $n$ carrying these marks under a pointer, $o$.

By means of a suitable meter mechanism connected with the gearing, the number of rotations of the wheel $d$ may be registered, so that by observation of the meter at different hours, the speed of the vessel may be read or computed.

The index mechanism may be placed below the deck, or in the cabin, or at any other convenient and suitable locality.

By my construction I avoid cutting any holes through the bottom of the vessel to receive the shaft of a log mechanism, and consequently all expense or danger incident thereto. The vertical rod for transmitting upward the motion of the wheel, instead of passing between decks, as has heretofore been done, I support upon the rudder-post outside the vessel. The mode of application is thus cheap and simple, allowing of its ready attachment to any ordinary vessel. Besides, by swinging the wheel and its protecting case coincidently with the rudder, I, in a great measure, avoid its being improperly actuated by eddying currents.

I claim—

The water-wheel $d$, applied to the rudder and working within the case $f$ on the rudder, and connected by suitable gearing and a shaft supported by the rudder-post, with an index mechanism, substantially as shown and described.

LEWIS F. PIERCE.

Witnesses:
 FRANCIS GOULD,
 M. W. FROTHINGHAM.